United States Patent [19]
Doyle et al.

[11] 3,780,673
[45] Dec. 25, 1973

[54] RESILIENT SHOCK-ABSORBING BULKHEAD

[76] Inventors: William F. Doyle, 2818 McAlister St., Topeka, Kans. 66614; Charles W. Artzer, 631 Freeman St., Topeka, Kans. 66616

[22] Filed: Aug. 25, 1972

[21] Appl. No.: 283,761

[52] U.S. Cl............... 105/376, 105/369 B, 105/374
[51] Int. Cl............................................. B60p 7/14
[58] Field of Search................. 105/368 S, 369 B, 105/376, 374; 296/28 R, 28 M

[56] References Cited
UNITED STATES PATENTS

| | | | |
|---|---|---|---|
| 2,819,688 | 1/1958 | Hall | 105/374 |
| 2,826,156 | 3/1958 | Hall | 105/376 |
| 2,972,490 | 2/1961 | Styx | 105/376 |
| 2,978,993 | 4/1961 | Hall | 105/374 |
| 3,193,122 | 7/1965 | Sauthoff | 105/376 |
| 3,451,357 | 6/1969 | Barnard et al. | 105/376 |
| 3,583,333 | 6/1971 | Matyas | 105/376 |

*Primary Examiner*—Drayton E. Hoffman
*Attorney*—Richard K. Stevens et al.

[57] ABSTRACT

A bulkhead for use on vehicles having an open flat cargo carrying surface and stake pockets comprises a retaining panel removably attached to the bed of the vehicle by means of sleeves secured to the panel and slidably mounted on a supporting rail secured to posts disposed in stake pockets. Springs mounted on the rail are compressed when a load is applied to the panel by shifting cargo and to absorb the shock of the impact.

11 Claims, 7 Drawing Figures

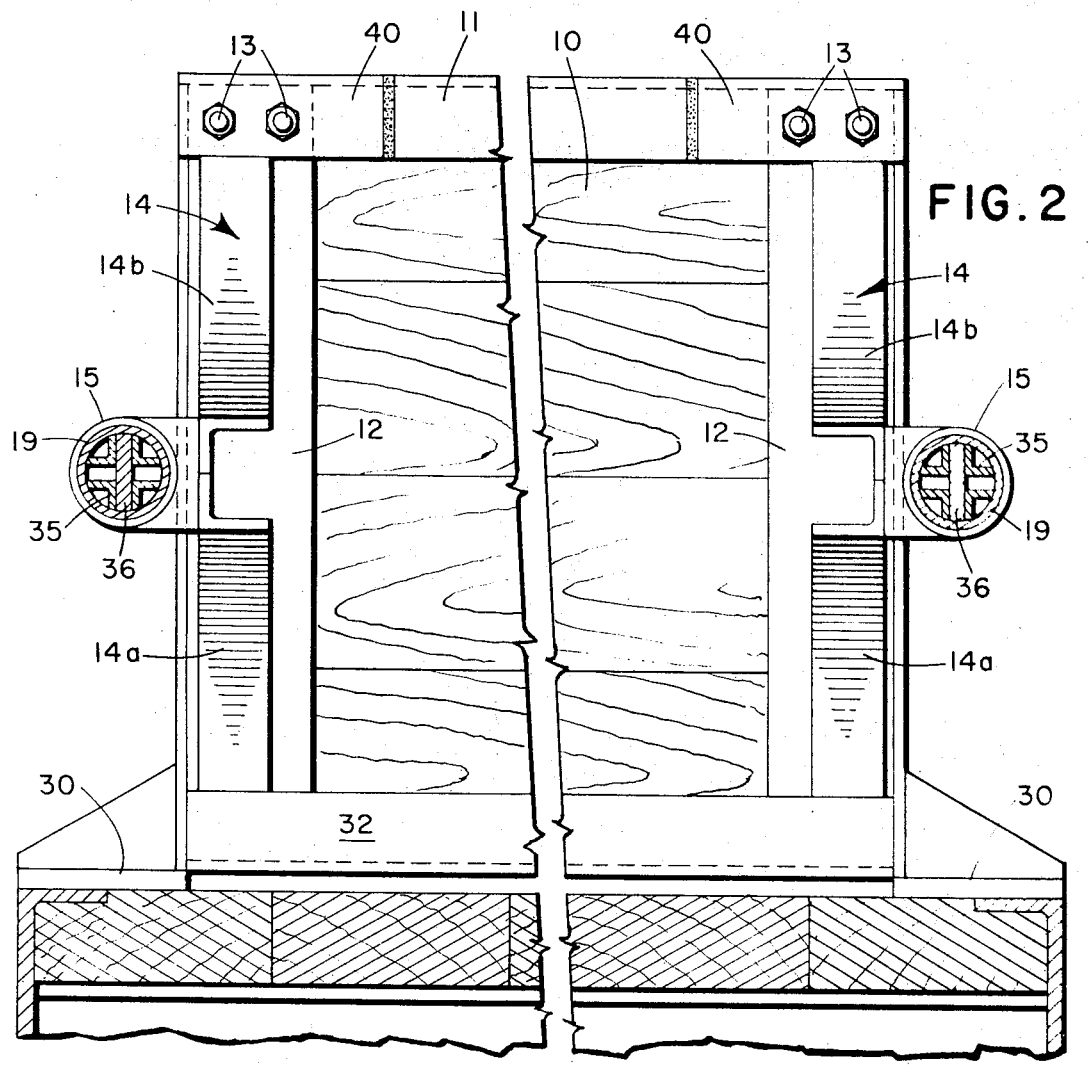
FIG. 2
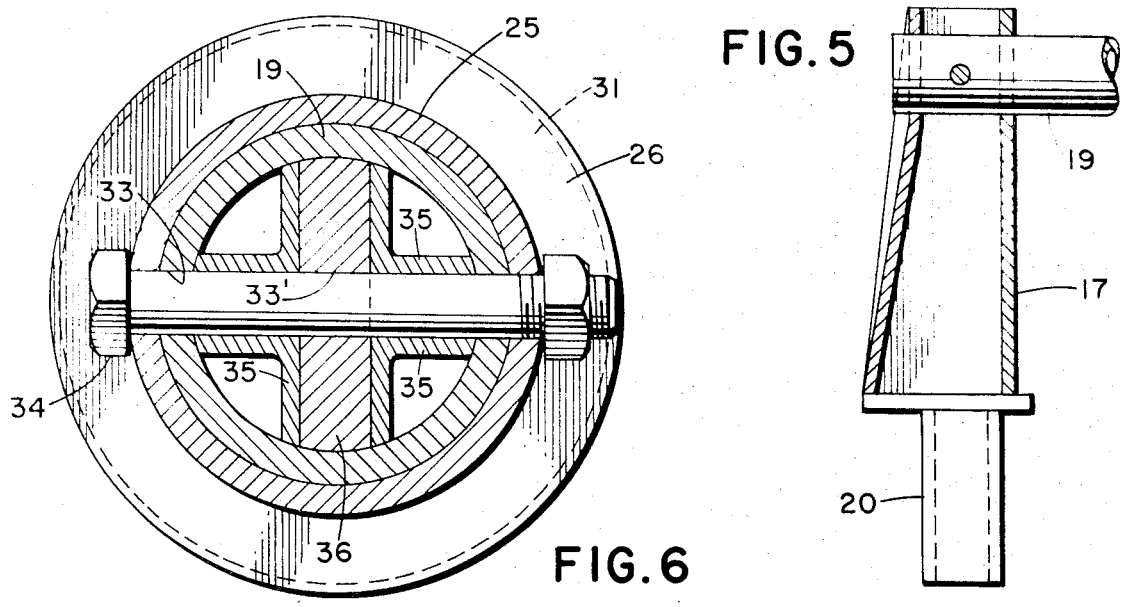
FIG. 5
FIG. 6

RESILIENT SHOCK-ABSORBING BULKHEAD

This invention relates generally to cargo carrying vehicles and more particularly to bulkheads for such vehicles and to vehicles provided with the bulkheads.

It is the practice to haul various kinds of cargo which do not require the protection of an enclosure on highway trailers and railway cars which have an open flat load carrying surface. Such trailers and cars are provided with stake pockets and are easily loaded with heavy cargo such as coiled steel, metal rods, metal sheets, pipes, castings and the like because there are no side walls or top to interfere with loading equipment. Cargo of the aforesaid kind is most often transported today on highway trailers. If the cargo is to be transported a great distance the most popular practice is to place the cargo on a trailer, transfer the loaded trailer to a railway flat car at the nearest railway freight yard and to transport the trailer and its load the greater part of the distance to its destination "piggy-back" on the railway car.

The trailer is secured against relative movement on the flat car with its surface substantially parallel to the underlying surface of the car but it has been found that in spite of this precaution the cargo sometimes shifts upon rapid acceleration or deceleration of a train. In fact, there have been instances where loads of steel have fallen from the trailer across the rails and caused derailments. Various kinds of bulkheads have been disclosed for railway flat cars but none of these has been adopted for trailers in "piggy-back" service probably because they cannot be moved longitudinally on the car's surface to accomodate variations in the dimensions of the cargo or they are so complicated mechanically that their use would be expensive and impractical.

It is therefore an object of this invention to provide an improved bulkhead which is devoid of the foregoing disadvantages. Another object of the invention is to provide a bulkhead particularly well suited for use on highway trailers having a flat cargo carrying surface. Still another object of the invention is to provide a shock-absorbing bulkhead for freight vehicles having an open flat cargo carrying surface and stake pockets which is adapted to be moved longitudinally of the surface to accomodate lading of various dimensions. A more specific object of the invention is to provide a bulkhead for freight vehicles which is resilient and adapted to absorb the shock applied to its retaining panel when the cargo shifts with sudden acceleration or deceleration. A still further object of the invention is to provide a freight vehicle having a resilient shock-absorbing bulkhead removably attached thereto.

Other objects will become apparent from the following description with reference to the accompanying drawing wherein:

FIG. 2 is a fragmentary front elevation of the bulkhead, taken along line 2—2 of FIG. 1;

FIG. 5 is a vertical sectional view of a rail support, taken along line 5—5 of FIG. 4;

FIG. 6 is a cross-section of the support and adjusting rail, taken along line 6—6 of FIG. 3.

Figure 1:
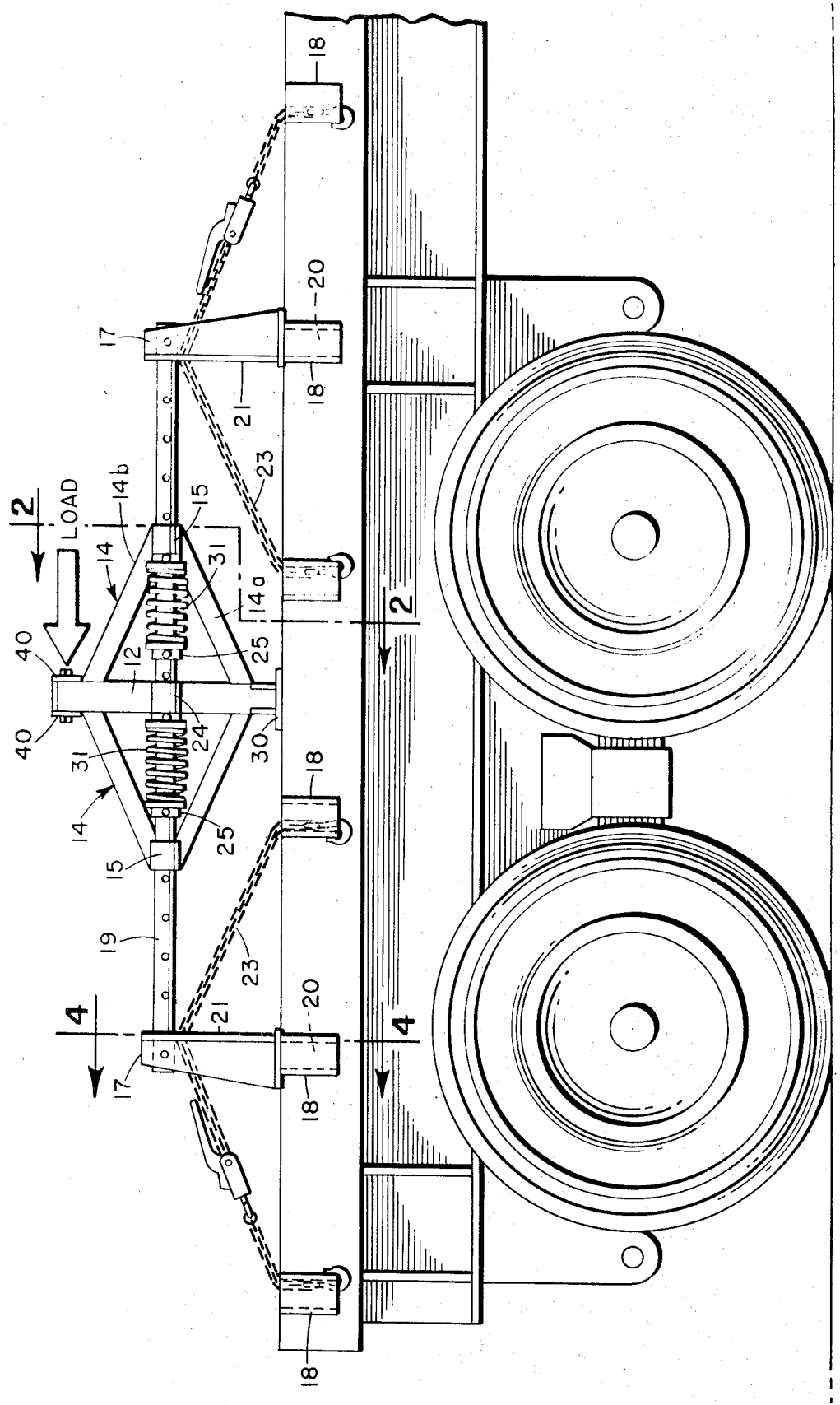
FIG. 1 is a side elevation of a flat-bed trailer with an embodiment of the bulkhead attached thereto.
Figure 3:
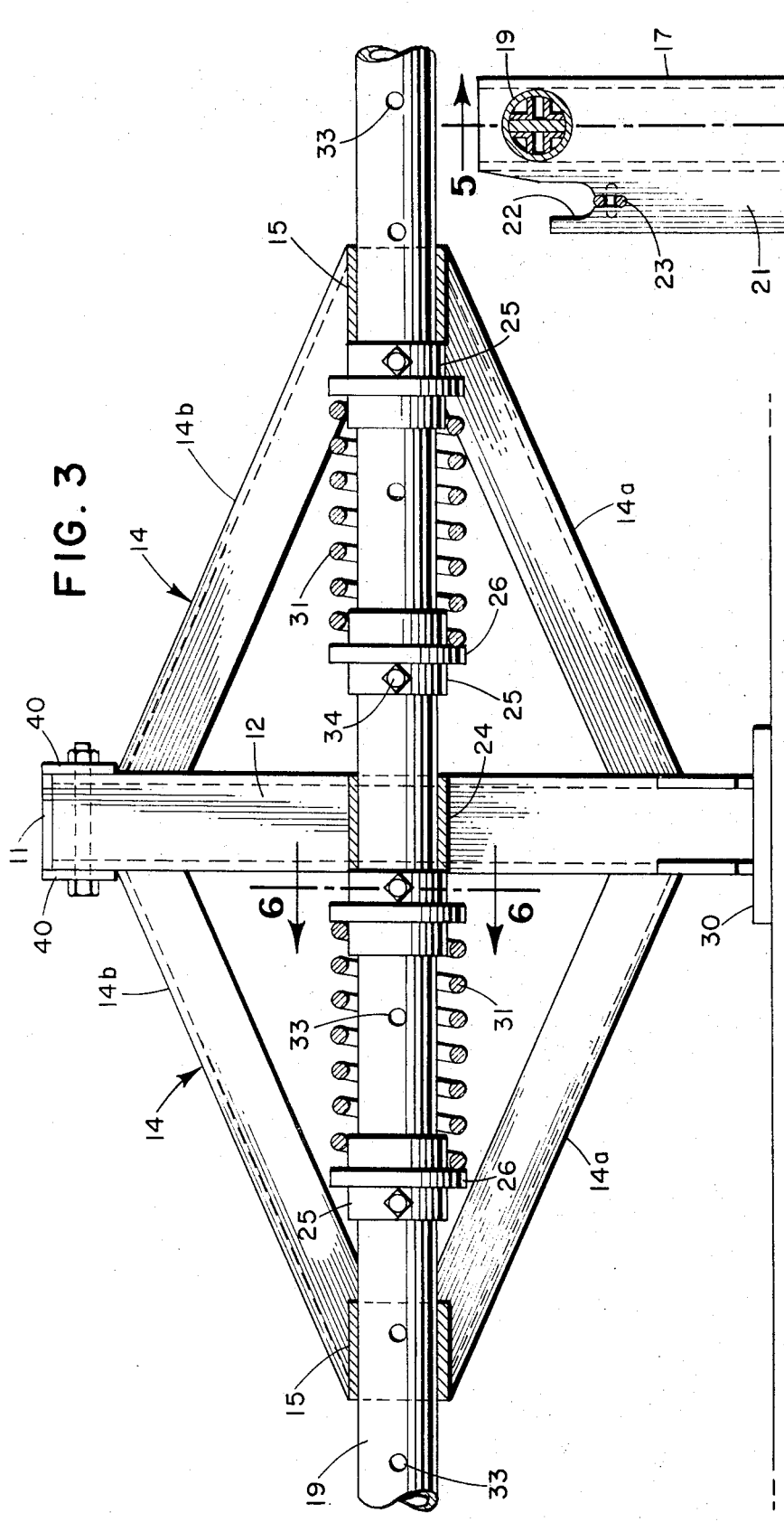
FIG. 3 is an enlarged side elevation of the bulkhead, with some parts in section.

The foregoing objects and others are accomplished in accordance with this invention, generally speaking, by providing a removable shock-absorbing bulkhead for freight vehicles which have an open flat surfaced bed with stake pockets spaced longitudinally along the sides thereof. The bulkhead has a retaining panel removably secured at each end to the bed by posts disposed in stake pockets. A supporting rail spans the space between the posts and is secured thereto. The retaining panel is slidably mounted at each end on the rail. A spring or other resilient means is provided to resist sliding of the panel on the rail under impact and to act as a shock-absorber. More specifically, the invention provides a bulkhead having a shock-absorbing retaining panel which extends laterally across a vehicle's cargo carrying surface, a pair of longitudinally spaced posts on each side of the cargo carrying surface adapted to be disposed simultaneously in stake pockets, a supporting rail spanning the space between the posts on each side and secured thereto, sleeves fixed to the panel and slidably disposed on the rail, and springs between the sleeves which compress to permit the panel to move away from an applied load and to absorb the shock of the impact. A triangularly shaped bracket is secured at its base to each side of the panel. Each bracket has a sleeve secured thereto which is slidably disposed over the rail. An intermediate sleeve is secured to the end of the panel and is also slidable disposed on the rail. The rail is preferably a tube or pipe and has a series of longituindally spaced holes therein. A coil spring is disposed about the rail between each collar carried by the bracket and the intermediate sleeve. A flanged bushing or collar may be slidably disposed on the rail between each end of the spring and the adjacent sleeve. The panel may be positioned anywhere along the length of the rail by means of a pin or bolt disposed in one of the holes through the rail. The spring may be pre-loaded, if desired, by spacing the pins to compress the springs between the collars.

The bulkhead may be fixed against vertical displacement from the vehicle by means of a chain which is secured at each end to a stake pocket and passes through a slot in a bracket carried by a post. The slot in the bracket may have a top portion having dimensions about equal to a chain link horizontally disposed therein and a lower portion having dimensions such that a vertically disposed link will fit snugly therein. With such a slot, the chain can be stretched tightly regardless of whether the link therein is horizontally or vertically disposed. It is preferred that the rail span the space between at least three or four stake pockets in order that there will be at least one and preferably two pockets between the posts. A separate chain may then be secured at each end to a stake pocket adjacent to the one in which the post is disposed.

Referring now to the drawing, the illustrated embodiment has an upstanding retaining panel 10 which extends laterally across the cargo carrying bed of a vehicle. Panel 10 is fabricated from wood such as conventional flooring having tongue and groove joints. A channel member 11 is disposed over the top edge of the panel and a second channel member 32 is disposed over the bottom edge. A channel member 12 is disposed over each end of the panel 10. Metal plate members 40 may be welded to channel 11 and bolted to underlying channel 12 by bolts 13.

A pair of struts 14a and 14b are secured to one end to channel 12 and join at the opposite end to form a triangularly shaped bracket 14. A sleeve 15 is welded or otherwise secured at the apex of each bracket 14. An intermediate sleeve 24 is secured to each channel 12. Foot plates 30 secured to the bottom of each channel member 12 facilitates sliding of the bulkhead over the surface of the vehicle's bed.

Figure 4:
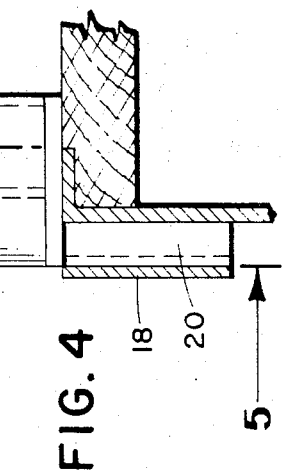
FIG. 4 is a front elevation of a rail support, taken along line 4—4 of FIG. 1.

Upstanding posts 17 are spaced from each other on each side of the vehicle bed, so that they may be disposed simultaneously in stake pockets 18. A rail 19 spans the space between stake pockets 18 and is pinned or otherwise secured through post 17 near the top thereof as shown in FIGS. 4 and 5. Sleeves 15 and 24 are slidably mounted on rail 19. Welded to the bottom of post 17 is a depending channel member 20 which fits inside stake pocket 18.

A slotted plate has its face welded to post 17 to form a bracket 21 having a slot 22. A chain 23 is secured at each end to a stake pocket 18 and passes through slots 22 of posts 17 to bind the assembly against vertical displacement from the vehicle bed.

A coil spring 31 is disposed about rail 19 between each sleeve 15 and sleeve 24. A bushing or collar 25 is slidably disposed about rail 19. An annular flange 26 carried by bushing 25 prevents the end of the spring 31 from telescoping over the bushing.

Figure 7:
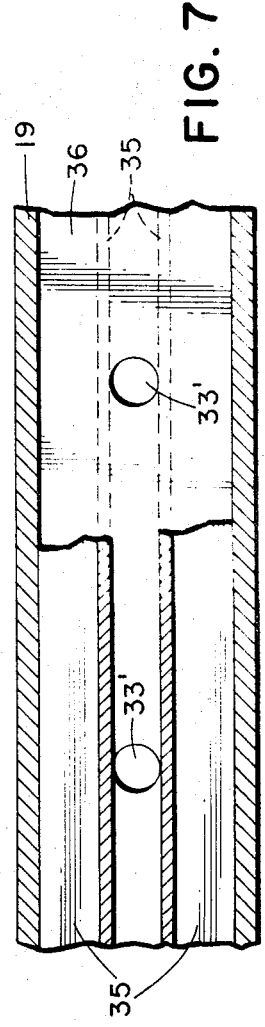
FIG. 7 is a longitudinal sectional view of a fragment of a support rail showing its internal reinforcement.

A plurality of holes 33 through rail 19 combine with bolts 34 to position panel 10 between posts 17. Suitable pins may be substituted for bolts 34. As illustrated in FIGS. 4, 6 and 7, four angle irons 35 are welded to a plate 36 to provide a reinforcing member which extends longitudinally through rail 19. The holes 33 in rail 19 and holes 33' through plate 36 permit adjustment of the panel 10 between stake pockets 18 and thus provide for movement of the panel 10 against the cargo regardless of the dimensions thereof.

Panel 10 may be fabricated from a corrugated metal sheet or any other suitable material instead of wood. A relatively large spring may be used so that the panel not only moves when struck by shifting cargo but will tend to move the cargo back to its original position. If corrugated steel or other metal is used for panel 10, the top and bottom channel members may not be required and angle iron members may be substituted for channels 12. Suitable elastomeric resilient members may be substituted for springs 31.

The shock-absorbing bulkhead may be attached to any vehicle including railway flat cars or the like having a flat bed for carrying cargo and having stake pockets attached to the bed.

Although the invention has been described in detail for the purpose of illustration it is to be understood that such detail is solely for that purpose and that variations can be made therein by those skilled in the art without departing from the spirit and scope of the invention except as it may be limited by the claims.

What is claimed is:

1. A bulkhead adapted for attachment to the cargo bearing surface of a vehicle provided with longitudinally spaced stake pockets around the said surface, said bulkhead comprising an upstanding retaining panel adapted to extend laterally across the said surface, means at each end of the panel for securing it to the vehicle comprising a pair of longitudinally spaced posts each adapted to be disposed in a stake pocket, a supporting rail spanning the distance between the posts and fixed against movement relative thereto, means carried by the retaining panel for slidably mounting it on said rail, and resilient means carried by the rail for resisting longitudinal movement of the retaining panel over the rail.

2. The bulkhead of claim 2 wherein the said rail has longitudinally spaced holes therethrough, a pair of springs are disposed about the rail and between said means for slidably mounting the panel on the rail and a pin in one of said holes.

3. The bulkhead of claim 1 wherein a bracket projects outwardly from each side of the retaining panel, a sleeve carried by each bracket is slidably disposed about the rail, an intermediate sleeve carried by the end of the panel is slidably disposed about the rail, said rail has longitudinally spaced holes therethrough, and a spring coiled about the rail is compressed between the intermediate sleeve and a pin in one of the holes.

4. The bulkhead of claim 3 wherein a pair of struts combine to form a triangularly shaped bracket with one end of each strut secured to the panel and the apex of the bracket carrying a sleeve.

5. A vehicle having a bed with a flat surface for carrying cargo and longitudinally spaced stake pockets secured to each side of the bed and a bulkhead removably attached to the bed's surface comprising an upstanding retaining panel which extends laterally across the bed, means at each end of the panel for resiliently resisting permanent longitudinal displacement thereof comprising a pair of posts each disposed in a stake pocket, a supporting rail spanning the distance between the posts and fixed against movement relative thereto, means carried by the retaining panel for slidably mounting the panel on said rail, and resilient means carried by the rail adapted to compress in response to a load applied against the retaining panel.

6. The vehicle of claim 5 wherein the resilient means is a spring coiled about the rail, the rail has longitudinally spaced holes therethrough, and the spring is disposed between the means carried by the panel for mounting the panel on the rail and a pin in one of the holes.

7. The vehicle of claim 5 wherein a bracket projects outwardly from each side of the retaining panel, a sleeve carried by each bracket is slidably disposed about the rail, an intermediate slidable sleeve is secured to the end of the retaining panel and is disposed about the rail and a spring is disposed about the rail and between the intermediate sleeve and a pin in a hole in the rail.

8. The bulkhead of claim 1 wherein the retaining panel is wood, channel members cover the top and bottom edges and each end of the retaining panel, and each post carries a bracket having a slot therein adapted to receive a chain link.

9. The vehicle of claim 7 wherein each post carries a bracket with a slot therein and a chain is secured to a stake pocket and is stretched through the slot of a first bracket, through a stake pocket between the brackets, through the slot in the second bracket and is secured at its opposite end to a stake pocket.

10. The bulkhead of claim 8 wherein a flanged bushing is disposed about the rail between each end of the spring and the pin.

11. A bulkhead adapted to be removably secured to the surface of an open bed of a freight vehicle, said bed having longitudinally spaced stake pockets along each side thereof, said bulkhead comprising a panel adapted to extend laterally across the bed, means at each end of the panel for securing it to the vehicle bed comprising a pair of struts on each side of the panel each having one end secured to the panel and the opposite ends secured together to form a triangularly shaped bracket, a post spaced longitudinally from each side of the panel and disposed in a stake pocket, a rail spaced above the vehicle bed and spanning the distance between the posts and secured thereto, a sleeve carried by each bracket and slidably mounted on the rail, a spring on each side of the panel about the rail, longitudinally spaced holes through the rail, a collar about the rail adjacent each end of the spring, and a pin in a hole on each side of the panel and against the spring positioning the panel on the rail, and means comprising a slotted bracket carried be each post and a chain looped through the slot and secured to stake pockets for preventing vertical displacement of the bulkhead from the vehicle.

* * * * *